United States Patent
Wong et al.

(10) Patent No.: US 12,101,783 B2
(45) Date of Patent: Sep. 24, 2024

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/606,764

(22) PCT Filed: Apr. 22, 2020

(86) PCT No.: PCT/EP2020/061226
§ 371 (c)(1),
(2) Date: Oct. 27, 2021

(87) PCT Pub. No.: WO2020/224967
PCT Pub. Date: Nov. 12, 2020

(65) Prior Publication Data
US 2022/0225303 A1    Jul. 14, 2022

(30) Foreign Application Priority Data
May 3, 2019   (EP) .................................... 19172640

(51) Int. Cl.
*H04W 72/23*   (2023.01)
*H04W 52/02*   (2009.01)

(52) U.S. Cl.
CPC ....... *H04W 72/23* (2023.01); *H04W 52/0212* (2013.01)

(58) Field of Classification Search
CPC .......................... H04W 72/23; H04W 52/0212
See application file for complete search history.

(56) References Cited

U.S. PATENT DOCUMENTS

| 2014/0105158 A1* | 4/2014 | Kim ...................... H04L 1/0038 370/329 |
| 2015/0009968 A1* | 1/2015 | Yu ......................... H04L 5/0053 370/336 |

(Continued)

OTHER PUBLICATIONS

International Search Report and Written Opinion mailed on Jul. 15, 2020, received for PCT Application PCT/EP2020/061226, Filed on Apr. 22, 2020, 9 pages.

(Continued)

*Primary Examiner* — Farid Seyedvosoghi
(74) *Attorney, Agent, or Firm* — XSENSUS LLP

(57) ABSTRACT

A method for receiving data by a communications device data from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the first and the second downlink communications resources are within a time period of the wireless access interface which ends at a pre-configured end time, the pre-configured end time being before the downlink control message is decoded.

20 Claims, 12 Drawing Sheets

(56) References Cited

U.S. PATENT DOCUMENTS

| | | |
|---|---|---|
| 2018/0098337 A1 | 4/2018 | Lee et al. |
| 2019/0104524 A1 | 4/2019 | Wong et al. |
| 2019/0313429 A1* | 10/2019 | Cheng .................. H04W 76/27 |

OTHER PUBLICATIONS

Nokia et al., "Revised SID: Study on NR Industrial Internet of Things (Iot)", 3GPP TSG RAN meeting #81, RP-182090, Sep. 10-13, 2018, 5 pages.

Holma et al., "LTE for UMTS OFDMA and SC-FDMA Based Radio Access", John Wiley & Sons, 2009, pp. 25-27.

3GPP, "NR; Medium Access Control (MAC) Protocol Specification (Release 15)", 3GPP TS 38.321 v15.3.0, Sep. 2018, pp. 1-76.

3GPP, "NR; Physical layer Procedures for Data (Release 15)", 3GPP TS 38.214 V15.2.0, Jun. 2018, pp. 1-94.

3GPP, "NR; NR and NG-RAN Overall Description; Stage 2 (Release 15)", 3GPP TS 38.300 V15.4.0, Dec. 2018, pp. 1-97.

Catt et al., "New WID: UE Power Saving in NR", 3GPP TSG RAN Meetings #83, RP-190727, Mar. 18-21, 2019, 5 pages.

3GPP, "Study on NR Industrial Internet of Things (IoT); (Release 16)", 3GPP TR 38.825 V16.0.0, Mar. 2019, pp. 1-33.

Huawei, Hisilicon, "Remaining issues on resource allocation and TBS", R1-1803709, Apr. 16, 2018.

Sony, "L1 enhancements on PDCCH for URLLC", R1-1900370, Jan. 21, 2019.

Sony, "On cross-slot scheduling for power saving", R1-1906857, May 3, 2019.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/061226, filed Apr. 22, 2020, which claims priority to EP 19172640.5, filed May 3, 2019, the entire contents of each are incorporated herein by reference.

BACKGROUND

Field

The present disclosure relates to communications devices, infrastructure equipment and methods for the reception of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
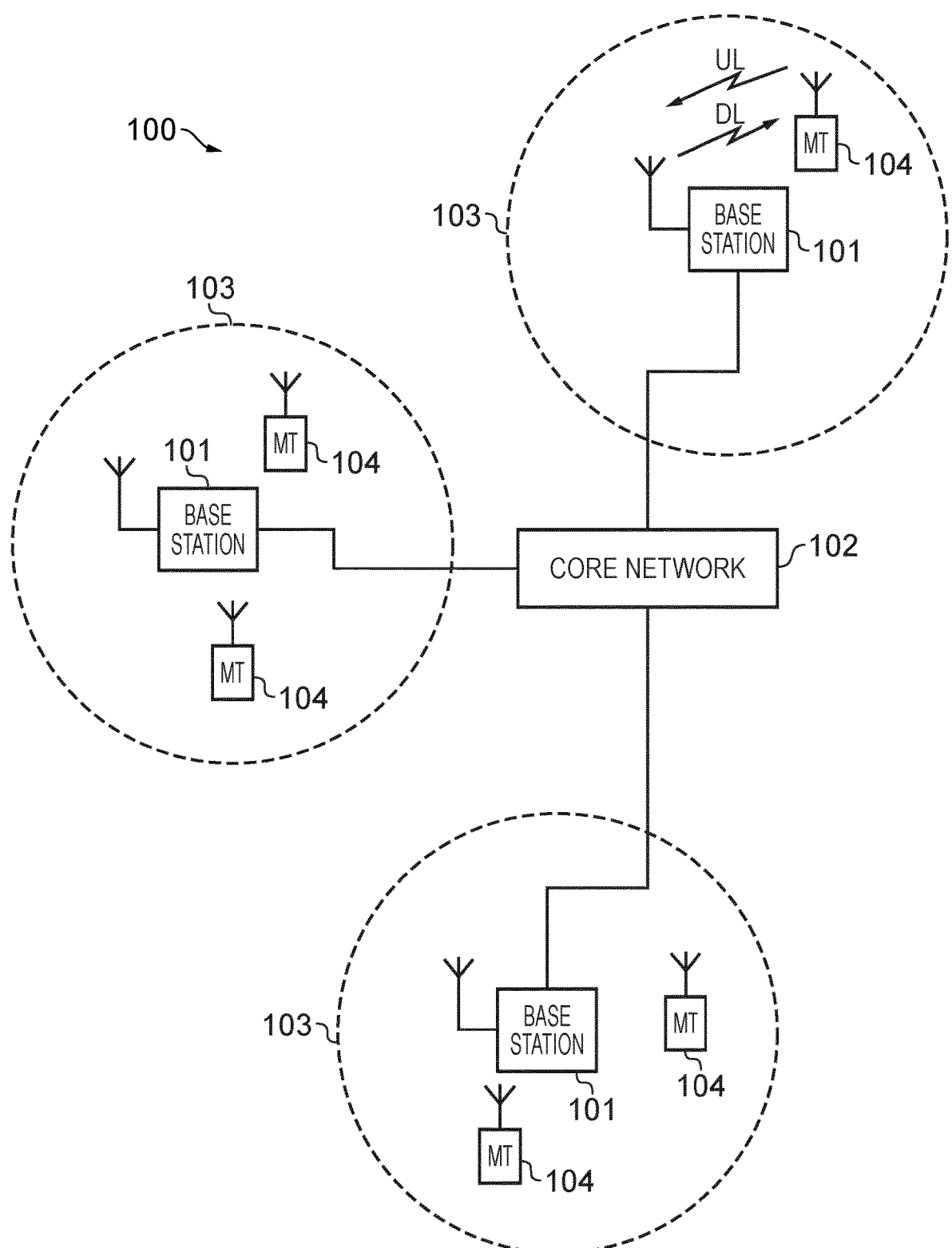
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
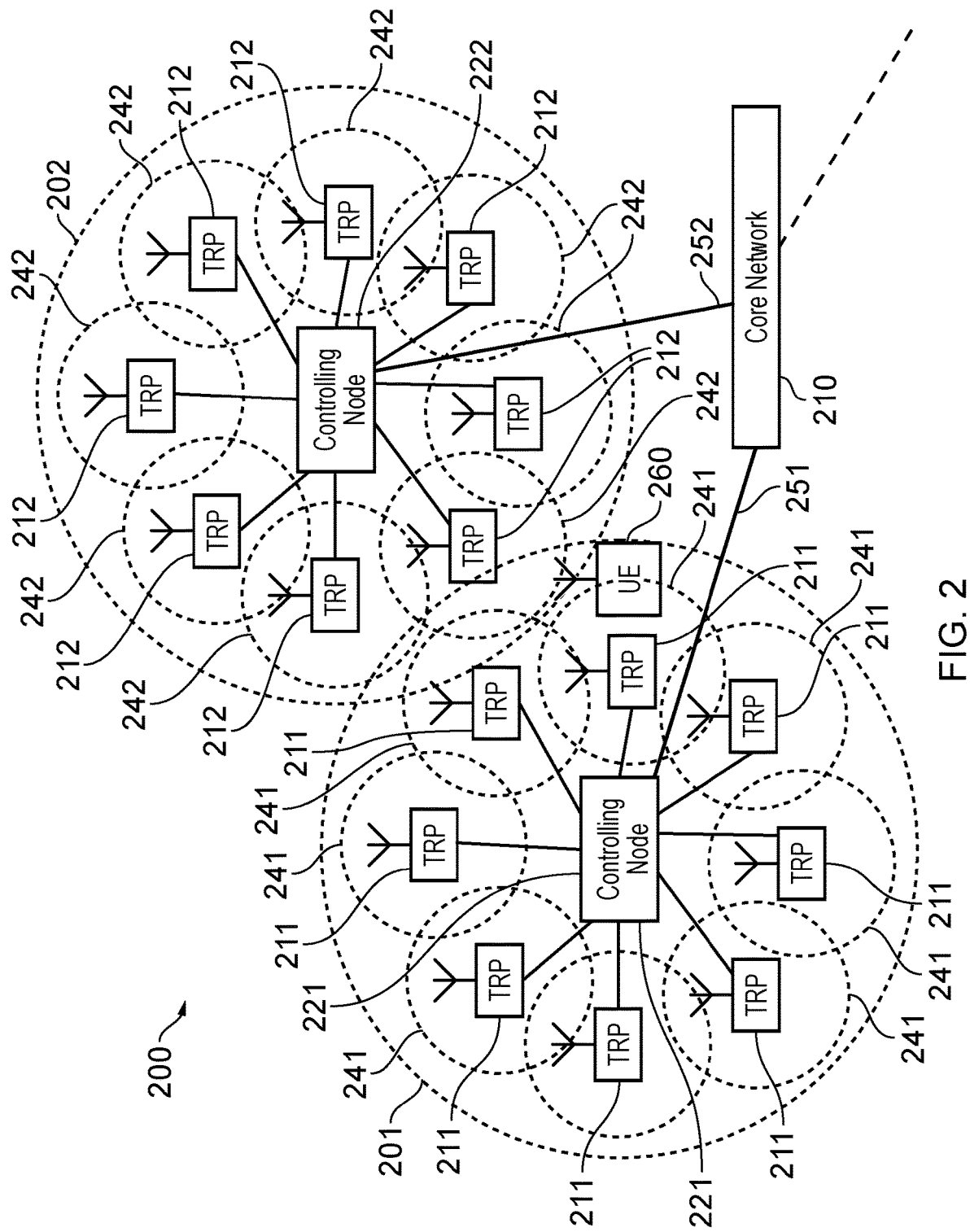
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
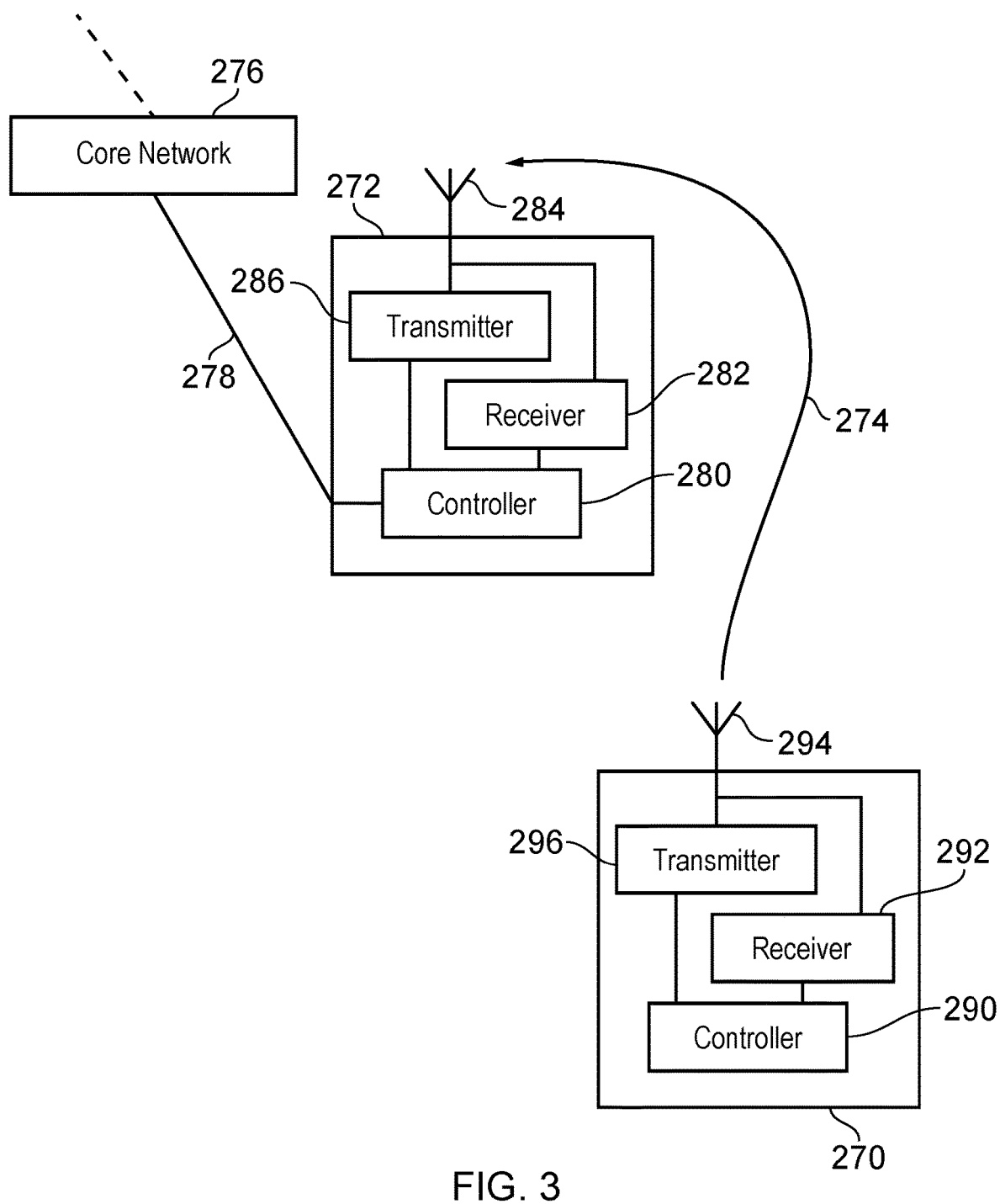
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC.

Downlink Control Information

In 5G/NR, communications resources for both uplink and downlink communications are allocated by the infrastructure equipment, and may be signalled to the communications device in downlink control information (DCI), transmitted using a physical downlink control channel (PDCCH).

Each communications device may be configured with a specific search space within which the PDCCH may exist, the search space defining communications resources (and, optionally, other parameters) with which DCI allocating communications resources to that communications device may be transmitted.

A communications device may be configured with a PDCCH search space for each of a plurality of services. For example, communications resources allocated for the transmission or reception of URLLC data may be allocated by means of DCI transmitted in accordance with one search space, while communications resources allocated for the transmission or reception of eMBB data may be allocated by means of DCI transmitted in accordance with a different search space. The multiple PDCCH search spaces may be mutually exclusive, such that any PDCCH transmission which is in accordance with one PDCCH search space is necessarily not in accordance with a different PDCCH search space configured for the same communications device.

The PDCCH search space(s) may be configured for the communications device by means of RRC signalling.

Even within the constraints of a configured search space, there may be different parameters according to which DCI may be transmitted to a communications device, and there is no specific a priori indication to the communications device indicating if, or how, any DCI will be transmitted to the communications device.

Accordingly, it is necessary for a communications device to 'blind decode' multiple PDCCH 'candidates' within the search space, in order to attempt to determine if any DCI has been transmitted to it. Because of the different permitted parameters for transmitting the DCI, the communications device may have to attempt multiple blind decode attempts for given communications resources on which the DCI may (or may not) be transmitted.

Communications Resources for Downlink Data

Downlink data transmitted to a communications device may be transmitted using a Physical Downlink Shared Channel (PDSCH). The PDSCH can be dynamically scheduled by the infrastructure equipment in a Downlink (DL) Grant, i.e. scheduling information contained in a DCI. The DCI may be formatted in accordance with one of a plurality of predetermined (e.g. standardised) formats, such as DCI Format 1_0 and DCI Format 1_1.

The DL Grant comprises Frequency Domain Resource Assignment (FDRA) and Time Domain Resource Assignment (TDRA) fields, which indicate the frequency and time resources of the PDSCH respectively. The FDRA indicates a number and location of physical resource blocks (PRBs) occupied by the PDSCH.

The TDRA field may comprise an index to a row of a TDRA Table, where each entry/row in this table specifies a position of downlink measurement reference symbols (DMRS), a mapping type for the PDSCH (which may be a Type A or Type B mapping), a slot gap parameter $K_0$, a start symbol offset S and a duration of the PDSCH resources L.

Figure 4:
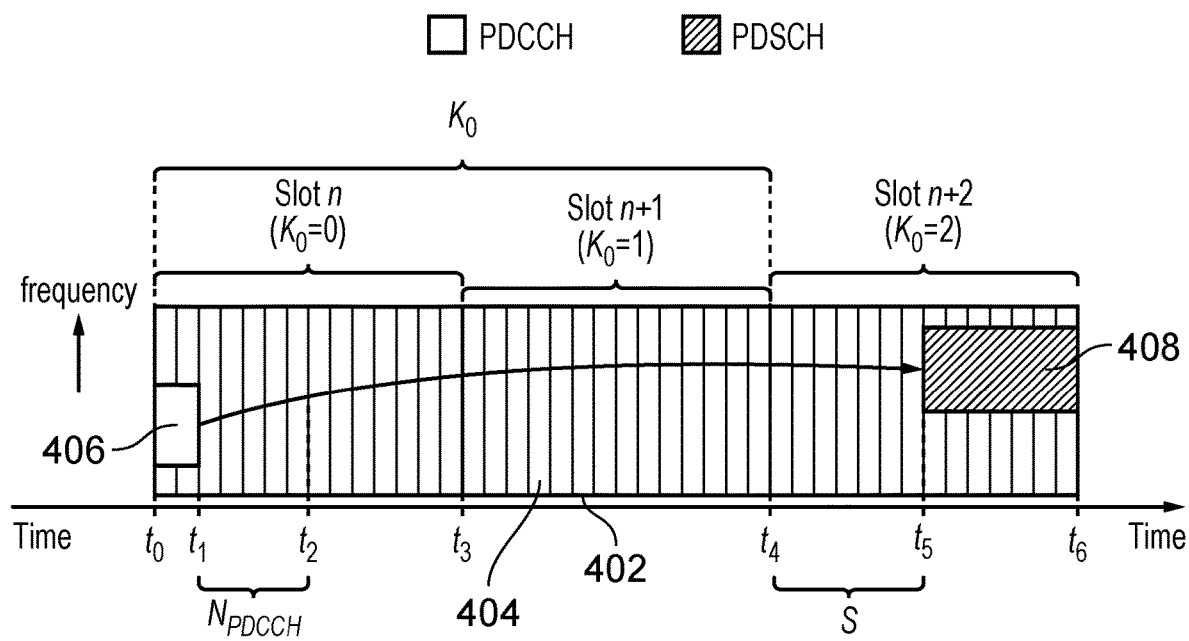
FIG. 4 illustrates a reception of downlink data in accordance with conventional techniques.

FIG. 4 illustrates a reception of downlink data in accordance with conventional techniques. FIG. 4 illustrates an example of a use of the $K_0$, S and L parameters for a PDSCH.

FIG. 4 shows communications resources 402 of a downlink of a wireless access interface of a wireless communications network. The communications resources are divided into timeslots n, n+1, n+2, each of which is further subdivided into 14 orthogonal frequency division multiplexing (OFDM) symbol periods 404.

A DL grant is transmitted within a PDCCH transmission 406 from time t0 to time t1 within timeslot n. The DL Grant comprises a TDRA index which points to an entry in the TDRA Table which indicates parameters $K_0$=2, S=7 and L=7. Since the DL Grant is in Slot n, the allocated PDSCH resources therefore start in Slot n+$K_0$, i.e. Slot n+2. The symbol offset from the slot boundary of Slot n+2 is indicated by the parameter S, which in this case is 7 symbols from the slot boundary. Accordingly, the start time of the PDSCH is at time t5 (7 symbols from the start of timeslot n+2). The duration of the PDSCH is L=7 symbols. Hence, the TDRA parameters indicate a PDSCH transmission between time t5 and t6 as shown in FIG. 4. The entries in the TDRA table may be semi-statically configured by radio resource configuration (RRC) and the size of the table may be up to 16 entries.

Until a DCI has been successfully decoded, it is not possible for the communications device to determine which, if any, communications resources have been allocated to it for the uplink or downlink transmission of data. In the case of downlink transmissions, if the allocated communications resources may coincide in time with the blind decoding of the DCI, it is necessary for the communications device to pre-emptively receive and buffer signals received on downlink communications resources which may be allocated for the downlink transmission of data. These buffered signals may subsequently be processed (i.e. decoded) only if DCI is successfully decoded indicating that downlink data is (has been) transmitted using these downlink communications resources.

In the example of FIG. 4, a downlink PDCCH transmission 406 occurs from time t0 to time t1. A communications device, such as the communications device 270 described above, controls its receiver 292 to receive the signals of the PDCCH, in accordance with a pre-configured PDCCH search space.

During the time period $N_{PDCCH}$ from time t1 to time t2, the communications device 270 performs blind decoding of the PDCCH received signals. The PDCCH transmission 406 may indicate that downlink communications resources starting at, or after, time t1 are allocated for the downlink transmission of data to the communications device 270. Accordingly, during the time period from t1 to t2, the communications device 270 may configure its receiver to receive downlink signals of a PDSCH on which the downlink data may be being transmitted.

In the example of FIG. 4, as a result of the blind decoding of the PDCCH signals received from time t0 to time t1, the communications device 270 determines that PDCCH transmission 406 comprises DCI. Furthermore, the communications device 270 determines that the DCI indicates that downlink communications resources 408 of the PDSCH, from time t5 to time t6, are allocated for the downlink transmission of data to the communications device 270. Accordingly, the communications device 270 may control its receiver 292 to receive signals of the PDSCH from time t5 to time t6. These received PDSCH signals may be decoded, and the communications device 270 may accordingly receive the data transmitted by the infrastructure equipment.

It has been appreciated that requiring the communications device 270 to enable its receiver during the time period t1 to t2 (i.e. while blind decoding of the PDCCH signal is being carried out) is an inefficient use of power, especially in cases (as in FIG. 4) where no PDSCH transmission is scheduled for the communications device 270 during that time.

To address this, one proposal within the context of ongoing work related to power-saving in 5G/NR [7] is that a DL grant may only allocate downlink communications resources which start in a slot occurring after the slot in which the DL grant is transmitted. In other words, $K_0$ may be constrained to be no less than 1. Such scheduling is referred to as 'cross-slot scheduling'. In accordance with this proposal, the communications device 270 would not be required to enable its receiver between the end of the communications resources on which the DCI may be transmitted, and the beginning of the subsequent slot.

As described above, one of the targeted services for 5G is Ultra Reliable Low Latency Communications (URLLC) where it is required that a data packet at layer 2 is transmitted with a latency that is less than 1 ms or 0.5 ms with reliability of 99.999% to 99.9999%. Since the cross-slot scheduling power saving scheme introduces additional latency, and considering that a slot duration may be 1 ms for 15 kHz Subcarrier Spacing, it is not suitable for URLLC transmissions. Hence, a different power saving scheme is required for URLLC.

Embodiments of the present technique provide a method for receiving data by a communications device from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the first and the second downlink communications resources are within a time period of the wireless access interface which ends at a pre-configured end time, the pre-configured end time being before the downlink control message is decoded.

In accordance with embodiments of the present technique, downlink data is constrained to be transmitted within a certain PDSCH time window. In particular, the PDSCH time window may be characterised by a PDSCH time window end which may be referred to as a pre-configured end time, which occurs prior to the end of a time period during which the communications device 270 performs decoding of a received downlink control message, which may be transmitted using, for example, PDCCH signals. Accordingly, the communications device 270 is able to disable part or all of its receiver 292 after the end of the time window, thus reducing power consumption compared with conventional techniques, which may require the communications device to continue to receive signals until the downlink control message has been decoded. In addition, embodiments of the present technique can ensure that latency requirements associated with the data can be satisfied.

Figure 5:
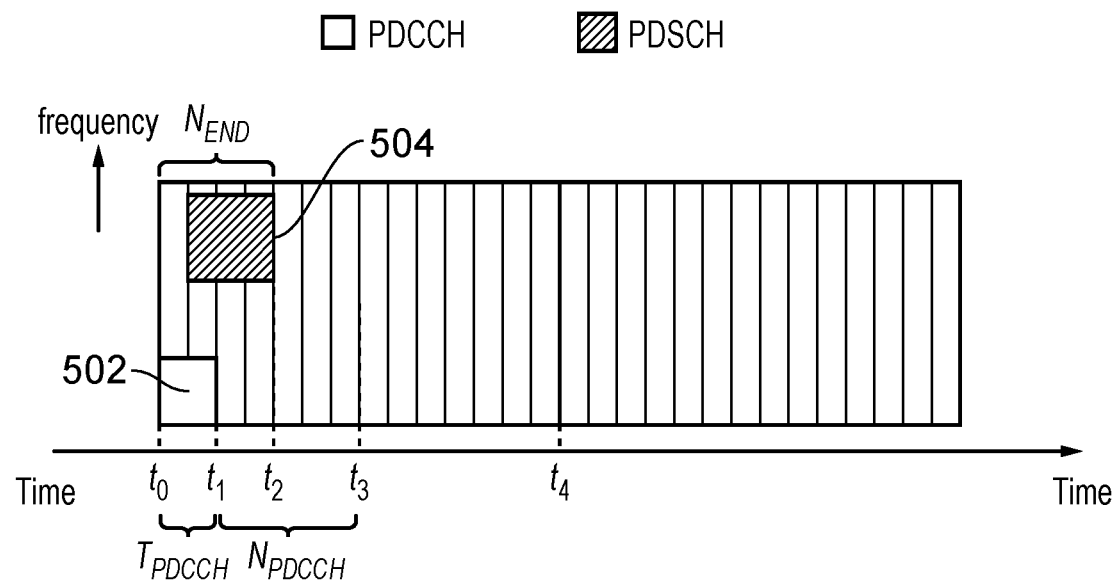
FIG. 5 illustrates an example downlink transmission of data in accordance with embodiments of the present disclosure.

FIG. 5 illustrates an example downlink transmission of data in accordance with embodiments of the present disclosure.

In the example shown in FIG. 5, in accordance with the preconfigured PDCCH search space, the communications device 270 enables its receiver for receiving PDCCH signals from time t0 to time t1. In the example of FIG. 5, the PDSCH time window end is time t2. That is, a transmission of downlink data on communications resources which are indicated by a DCI transmitted using the PDCCH from time t0 to time t1, is constrained to be completed by time t2.

Accordingly, the communications device 270 enables its receiver 292 to receive signals of the PDSCH until at least time t2, and may disable its receiver 292 at time t2, even if it has not yet completed decoding of the PDCCH signals received from time t0 to time t1.

In the example of FIG. 5, the PDSCH time window end or time t2 (i.e. the time after which downlink data transmission cannot occur) is characterised by a parameter $N_{END}$, which specifies a duration between the start of the PDCCH transmission (or potential PDCCH transmission) and time t2. However, the present disclosure is not so limited, and the PDSCH time window end may be determined in other ways, as will be described below.

In the example of FIG. 5, downlink data is scheduled to be transmitted using communications resources 504, and an indication of the communications resources 504 is transmitted within DCI transmitted using PDCCH transmission 502.

As described above, the communications device 270 may require $N_{PDCCH}$ OFDM symbols (i.e. until time t3) in order to decode the PDCCH transmission 502. It will be appreciated that since time t2 occurs prior to time t3, then in accordance with embodiments of the present technique, the power consumption of the communications device 270 may be reduced, compared with conventional techniques, since the communications device 270 is not required to enable its receiver 292 to receive signals between time t2 and time t3.

Determination of PDSCH Time Window End

According to embodiments of the present technique, for each possible PDCCH instance (such as, in accordance with the preconfigured associated PDCCH search space), the communications device 270 determines the PDSCH time window end. Techniques by which the PDSCH time window end may be determined, in accordance with embodiment of the present technique, will now be presented.

TDRA Table Configuration

In some embodiments, the infrastructure equipment 292 configures the communications device 270 with a TDRA table, that is, a correspondence between TDRA indices and parameters defining the start time and duration of allocated PDSCH resources. The parameters may define the start time and duration relative to a slot in which DCI comprising the TDRA index is transmitted, as described above.

In some such embodiments, the PDSCH time window end is determined by calculating the latest end time for allocated PDSCH resources which can be indicated in accordance with any of the rows/indices of the TDRA table.

An example of a TDRA table is shown in Table 1, in which the PDSCH Mapping Type and DMRS position parameters are omitted for conciseness.

TABLE 1

Example TDRA entries for PDSCH

| TDRA Index | $K_0$ | S | L |
|---|---|---|---|
| 0 | 0 | 0 | 2 |
| 1 | 0 | 0 | 4 |
| 2 | 0 | 2 | 2 |
| 3 | 0 | 2 | 3 |

Figure 6:
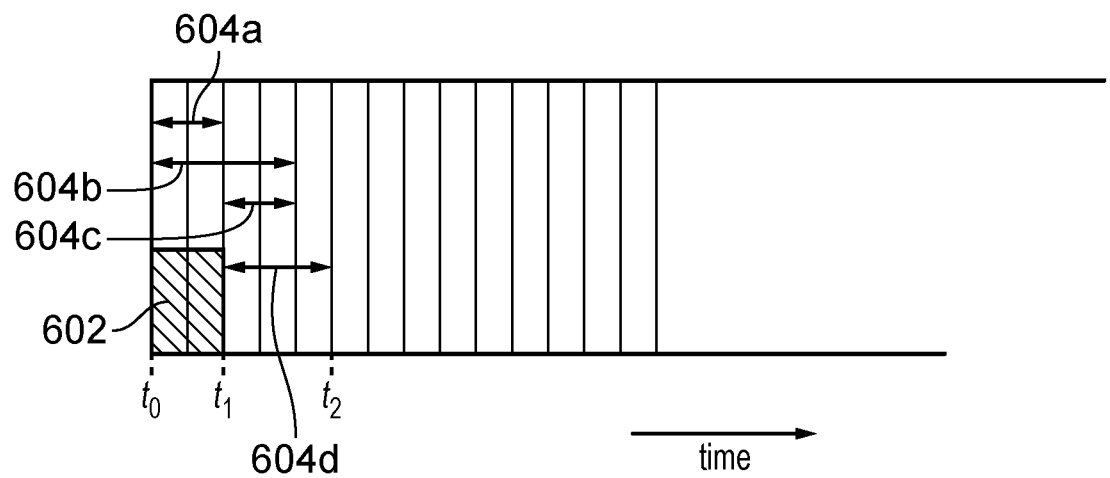
FIG. 6 illustrates possible durations of allocated downlink shared channel resources in accordance with embodiments of the present technique.

FIG. 6 illustrates possible PDSCH durations in accordance with embodiments of the present technique. Specifically, FIG. 6 illustrates a potential PDCCH transmission 602 from time t0 to time t1 in accordance with a PDCCH search space. In addition, by means of arrows 604a, 604b, 604c, 604d, FIG. 6 also shows durations of PDSCH transmissions scheduled by means of the inclusion of an indication of the TDRA indices 0 to 3 respectively within DCI transmitted using the PDCCH transmission 602. (The relative vertical positioning of the arrows 604 has no significance).

In the example of FIG. 6, the communications device 270 first determines that DCI may be transmitted using a PDCCH transmission 602 in accordance with a PDCCH search space with which the communications device 270 is configured.

The communications device 270 may then determine that, in accordance with the TDRA table shown in Table 1, the latest possible end time for a PDSCH scheduled by such a DCI is time t2 (the end time of a PDSCH transmission scheduled using TDRA index 3).

Accordingly the communications device 270 determines that the PDSCH time window end is at time t2.

In some embodiments, the TDRA table is configured by the infrastructure equipment 272 in response to an indication by the communications device 270 of a requested $N_{END}$ value and/or of the communications device's $N_{PDCCH}$ value. For example, in some embodiments, the communications device 270 may transmit a PDSCH time window end request indication to the infrastructure equipment 272, the PDSCH time window end request indication comprising an indication that the $N_{PDCCH}$ value of the communications device 270 is 5 OFDM symbols.

In response, the infrastructure equipment 272 may transmit an indication of a TDRA table in which all indices are associated with a PDSCH time window end occurring at or prior to 5 OFDM symbols after the end of the associated PDCCH transmission. Preferably, the infrastructure equipment 272 transmits an indication of a TDRA table in which all indices are associated with a PDSCH time window end occurring prior to $N_{PDCCH}$ OFDM symbols after the end of the associated PDCCH transmission.

Explicit Configuration of $N_{END}$

In some embodiments, the communications device determines the PDSCH time window end based on a predetermined parameter. In some embodiments, an indication of the predetermined parameter may be transmitted by the infrastructure equipment 272.

In some embodiments, the infrastructure equipment 272 may transmit an indication of the $N_{END}$ value. Accordingly, the communications device 270 determines that the PDSCH time window end occurs $N_{END}$ OFDM symbols after the start of a corresponding PDCCH transmission.

In some embodiments, the communications device may first transmit an indication of a requested value for a parameter (such as a requested $N_{END}$ parameter value). The request may comprise an indication of the $N_{PDCCH}$ value of the communications device.

In some embodiments, the communications device 270 transmits an indication of its PDCCH processing time $N_{PDCCH}$ to the infrastructure equipment 272. The predetermined parameter (such as $N_{END}$) may be determined based on the $N_{PDCCH}$ value indicated to the infrastructure equipment 272. The predetermined parameter may be determined based on the $N_{PDCCH}$ value in accordance with a predetermined rule. For example, $N_{END}$ may be set to be equal to $N_{PDCCH}$. Thus, in some embodiments, no explicit indication of the predetermined value is transmitted by the infrastructure equipment 272 to the communications device 270.

In some embodiments, the PDCCH processing time $N_{PDCCH}$ may be implicitly determined based on a maximum number of blind decoding attempts that may be required by the communications device 270 to decode a particular PDCCH transmission. The maximum number of blind decoding attempts may be determined by RRC signalling from the infrastructure equipment 272 or a UE capability of the communications device 270. The maximum number of blind decoding attempts may further depend on, for example, a number of possible code rates with which the PDCCH transmission is encoded, a number of different communications resources on which the PDCCH transmission may occur, and a number of redundancy options with which the PDCCH transmission may be encoded.

An indication of a relationship between the maximum number of blind decodes and the PDCCH processing time $N_{PDCCH}$ may be transmitted by the communications device 270 to the infrastructure equipment 272. Accordingly, in some embodiments, the infrastructure equipment 272 may determine the PDCCH processing time $N_{PDCCH}$ based on the indication of the relationship between the maximum number of blind decodes and the PDCCH processing time $N_{PDCCH}$.

For example, if the maximum number of blind decodes are 22 (respectively 44), the PDCCH processing time $N_{PDCCH}$ may be 2 (respectively, 4) OFDM symbols.

Inapplicable Rows

In some embodiments, one or more rows of the configured TDRA table may be incompatible with the predetermined parameter. In some such embodiments, the infrastructure equipment 272 may select for allocation communications resources which are compatible both with the predetermined parameter and which are in accordance with one of the rows of the configured TDRA table. In other words, the infrastructure equipment 272 may refrain from allocating communications resources which are in accordance with (i.e. can be indicated by means of) one or more rows of the configured TDRA table, if the resulting communications resources would be incompatible with the predetermined parameter and thus extend beyond the PDSCH time window end, when determined based on the predetermined parameter.

To illustrate an example of such embodiments, Table 2 shows a further example of a configured TDRA table. Table 2 omits for conciseness the PDSCH Mapping Type and DMRS position parameters.

TABLE 2

Example TDRA entries for PDSCH

| TDRA Index | $K_0$ | S | L |
|---|---|---|---|
| 0 | 0 | 2 | 4 |
| 1 | 0 | 10 | 4 |
| 2 | 1 | 0 | 2 |
| 3 | 2 | 7 | 7 |

In this example, it is clear that some TDRA table entries indicate a PDSCH transmission which occurs significantly after the PDCCH transmission. For example, TDRA index=3 indicates PDSCH resources which start 2 timeslots after the timeslot in which the PDCCH transmission occurs.

In this example, the communications device 270 determines that, in accordance with the predetermined parameter, $N_{END}=6$. That is, the PDSCH time window end occurs 6 OFDM symbols after the start of the corresponding PDCCH transmission. In this example, $N_{PDCCH}$ for the communications device 270 is 6 OFDM symbols.

Figure 7:
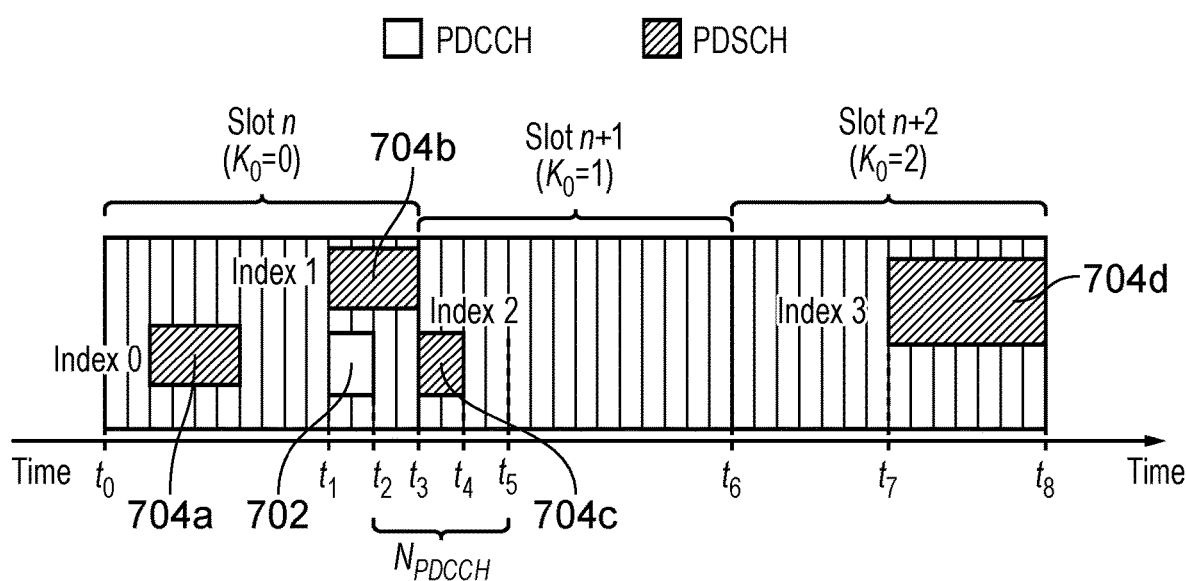
FIG. 7 illustrates reception of downlink data in accordance with embodiments of the present disclosure.

FIG. 7 shows a PDCCH transmission 702 from time t1 to time t2 in accordance with a PDCCH search space, and four possible PDSCH transmissions 704a-d whose start time and duration can be indicated by the TDRA table shown in Table 2.

Based on the determination that $N_{END}=6$ and the start time t1, the communications device determines that the PDSCH time window end is at time t4, being 6 OFDM symbols after time t1.

Accordingly, the communications device 270 may in some embodiments determine that TDRA indices which may indicate PDSCH communications resources which finish after the PDSCH time window end are inapplicable, i.e. may not be used by the infrastructure equipment 272 for indicating the allocated communications resources for the transmission of downlink data.

A corresponding determination may be made by the infrastructure equipment 272. That is, based on the predetermined parameter, the PDCCH location and the TDRA table configured for the communications device 270, the infrastructure equipment 272 may determine that one or more TDRA table entries may not be used to indicate an allocation of PDSCH resources for the transmission of downlink data to the communications device 270.

Similarly, the infrastructure equipment 272 and/or communications device 270 may determine that the downlink data must be scheduled for transmission using allocated PDSCH resources which finish at or before the PDSCH time window end and that the allocated PDSCH resources must be selected from those which can be indicated by means of TDRA table indices which are not determined to be inapplicable, as described above.

In the example of FIG. 7, therefore, the PDSCH resources 704d, which finish at time t8 (t8>t4) cannot be used for the transmission of the downlink data. Accordingly, the row corresponding to TDRA index 3 is determined to be inapplicable.

It should be noted that PDSCH resources 704a occur prior to the PDCCH transmission 702. However, because these resources finish before t4, in at least some embodiments, the corresponding index (TDRA index 0) is not determined to be inapplicable.

Applicable Rows Depend on PDCCH Location

In some embodiments, the TDRA entries which are inapplicable may be dependent on the location of the PDCCH.

Figure 8:
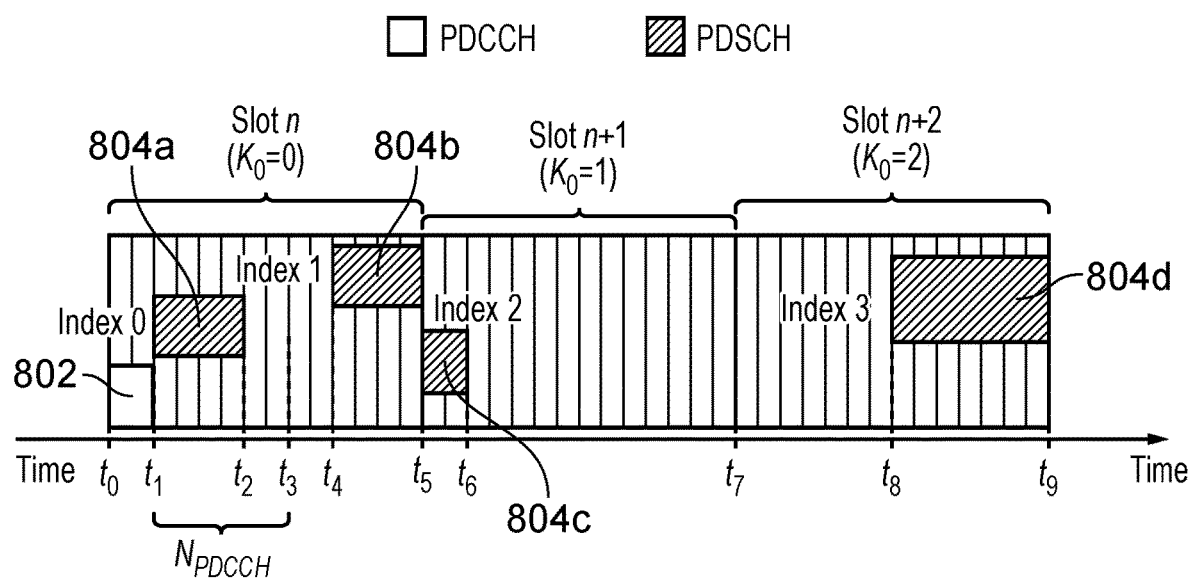
FIG. 8 illustrates reception of downlink data in accordance with embodiments of the present disclosure.

FIG. 8 shows an example of a PDCCH transmission 802 from time t0 to t1, and four possible PDSCH communications resources 804a-d, in accordance with the TDRA table shown in Table 2.

As in the example of FIG. 7, the communications device determines that the PDSCH time window end is 6 OFDM symbols after the start time of the PDCCH transmission, i.e. at time t2. Accordingly, in the example of FIG. 8, only the resources corresponding to TDRA table index 0 can be validly used, since the resources corresponding to each of the other index values finish later than time t2. The communications device 270 and/or the infrastructure equipment 272 thus may determine that, for the PDCCH transmission 802, the TDRA index values 1, 2 and 3 are inapplicable.

Replace Inapplicable Rows with Other Values

In some embodiments, one or more rows of a configured TDRA table which are determined to be inapplicable may be adapted to correspond to parameters indicating allocated resources which comply with the PDSCH time window end.

For example, in the example of FIG. 7 shown above, in which the row corresponding to index 3 is determined to be inapplicable, the parameters associated with index 3 may be changed, as shown in Table 3 below:

TABLE 3

Modified TDRA entries for PDSCH

| TDRA Index | $K_0$ | S | L |
|---|---|---|---|
| 0 | 0 | 2 | 4 |
| 1 | 0 | 10 | 4 |
| 2 | 1 | 0 | 2 |
| 3 | 0 | 12 | 2 |

Accordingly, for the example in FIG. 7, TDRA index 3 may be used to indicate PDSCH resources starting at time t2 (i.e. the $12^{th}$ OFDM symbol of timeslot n) and finishing at time t4 (i.e. 4 OFDM symbols later).

In some embodiments, where there are two or more TDRA index values which are determined to be inapplicable, these may all be adapted to correspond to the same parameters. That is, each of the inapplicable TDRA index values refer to a same PDSCH communications resource allocation.

In some embodiments, the replacement parameters to be associated with non-applicable TDRA row entries may be preconfigured, for example by means of RRC signalling transmitted by the infrastructure equipment 272 to the communications device 270.

Different Power-Saving Schemes

A communications device may serve URLLC and eMBB traffic, i.e. the PDSCH/PUSCH allocated for the transmission or reception of data can be associated with a low latency requirement (for the transmission of URLLC data within its latency threshold) or may be associated with no, or little, latency restriction (e.g. for the transmission of eMBB data).

In some embodiments of the present technique, different power saving schemes are associated with the scheduling of downlink communications resources for the transmission of data having different latency requirements. For example, in some embodiments, resources for eMBB data transmission use the cross-slot scheduling power saving scheme described above.

In some embodiments, resources for the transmission of the URLLC data are scheduled using a power saving scheme that defines a PDSCH time window end, as described herein.

Where different power saving schemes may be used by the same communications device, the communications device needs to be aware of which scheme is applicable prior to detecting/decoding the PDCCH, since each scheme permits the communications device 270 to disable its receiver 290 at different times.

Thus in accordance with embodiments of the present technique, there are provided methods and apparatus for indicating when a particular scheme is to be applied. Accordingly, in some embodiments, the communications device 270 can determine whether a particular power saving scheme is applicable in respect of a PDCCH transmission (or potential PDCCH transmission) and/or which of a plurality of power saving schemes is applicable.

For example, in some embodiments, the communications device 270 may determine whether, for a particular PDCCH transmission (or potential PDCCH transmission), PDSCH communications resources will be allocated in accordance with either i) a power saving mode defining a PDSCH time window end as described herein, ii) a cross-slot power saving mode as described above, or iii) no power saving mode.

PDCCH Search Space

In some embodiments, a PDCCH search space is associated with a particular power-saving scheme (or no power-saving scheme). As described above, a PDCCH search space may characterise communications resources on which the infrastructure equipment 272 may transmit DCI allocating communications resources for the transmission and/or reception of data. Accordingly, the communications device 270 determines that a particularly power-saving scheme is associated with a PDCCH transmission (or potential PDCCH transmission) which is in accordance with a particular PDCCH search space, based on the power saving scheme (if any) associated with the PDCCH search space.

Other Options

In some embodiments, a power saving mode may be activated by means of a transmission of RRC signalling comprising an indication of the activated power saving mode.

In some embodiments, a power saving mode may be activated by means of a transmission of MAC signalling comprising an indication of the activated power saving mode.

In some embodiments, a power saving mode may be activated by means of a transmission of DCI comprising an indication of the activated power saving mode. In such embodiments, the DCI may be a group common (GC) DCI. In some embodiments, the DCI comprising the indication of the activated power saving mode comprises an indication of uplink or downlink communications resources.

As described above, if a power saving mode is changed or deactivated in respect of a particular PDCCH transmission, then the communications device must be able to determine this prior to the start of the PDCCH transmission. Therefore, preferably, a change or deactivation of a power saving mode is notified in a transmission preceding the first PDCCH transmission to which the new scheme applies.

If a power saving mode is newly activated, from a state in which no power saving mode which imposes restrictions on the scheduling of the PDSCH is active, then the communications device need not be able to determine this prior to the start of the PDCCH transmission. Therefore, in some embodiments, a change or deactivation of a power saving mode may be notified in a DCI transmitted using a first PDCCH transmission to which the new scheme applies.

The indicated power saving mode may be considered active until a further indication is received to the contrary.

In some embodiments, an indication of the activated power saving mode may comprise an indication that one or more rows the preconfigured TDRA table will not be used, i.e. will be 'deactivated'. For example, activation of a power saving mode defining a PDSCH time window end as described herein may be indicated by means of an indication that one or more rows of the preconfigured TDRA table are not applicable, the one or more rows being those which may be used to indicate PDSCH resources which finish later than $N_{PDCCH}$ symbols after an associated DCI.

The indication of the one or more deactivated rows may comprise a bitmap, with each bit corresponding to a row of the preconfigured TDRA table, a first setting (e.g. '1') of the bit indicating that the row is not deactivated, and a second setting (e.g. '0') of the bit indicating that the row is deactivated.

In some embodiments, the communications device 270 is preconfigured with two or more TDRA tables, one or more of which is associated with a respective power saving mode. For example, a first preconfigured table may comprise only entries which indicate PDSCH resources finishing no later than $N_{PDCCH}$ symbols after the end of a corresponding DCI, associated with a power saving mode defining a PDSCH time window end as described herein. A second preconfigured table may comprise entries which indicate PDSCH resources finishing later than $N_{PDCCH}$ symbols after the end of a corresponding DCI. The indication of the activated power saving mode may comprise an indication of which of the two or more preconfigured TDRA tables are to be used (i.e. activated) for subsequent resource allocations.

Different Inapplicable Rows

As described above, where a power saving scheme based on a PDSCH time window end is used, a row of a configured TDRA table may be determined to be inapplicable, based on a determination that communications resources allocated in accordance with the parameters of that row would not be compatible with the power saving scheme.

In some embodiments, a similar determination may be made in respect of a row for other power savings schemes. For example, returning to the example of FIG. 7, if cross-slot scheduling is applied, then TDRA index values 0 and 1 may be determined to be inapplicable, because the corresponding PDSCH resource allocation would start prior to the slot (slot n+1) after the slot in which the PDCCH transmission 702 occurs.

As described above, parameters associated with inapplicable rows may be adapted in accordance with predetermined rules, such that each row is associated with parameters indicating PDSCH resources which are in compliance with the applicable power saving mode.

In some embodiments, one or both of the inapplicable rows and the adapted parameters corresponding to those rows may be associated with a particular power savings scheme.

Accordingly, the communications device 270 may determine which (if any) power saving mode is activated. Based on the activated power saving mode, the communications device 270 may determine which (if any) rows of the configured TDRA table are inapplicable and, for an inapplicable row, may determine adapted parameters for that row based on the activated power saving mode.

An example of such adapted parameters corresponding to the TDRA table of Table 2, in the example of FIG. 7 is shown in Table 4.

TABLE 4

Modified TDRA entries for PDSCH based on power saving scheme

| TDRA Index | Configured parameters | | | Replacement for scheme defining PDSCH time window end | | | Replacement for cross-slot scheduling scheme | | |
|---|---|---|---|---|---|---|---|---|---|
| | $K_0$ | S | L | $K_0$ | S | L | $K_0$ | S | L |
| 0 | 0 | 2 | 4 | n/a | n/a | n/a | 1 | 2 | 4 |
| 1 | 0 | 10 | 4 | n/a | n/a | n/a | 1 | 10 | 4 |
| 2 | 1 | 0 | 2 | n/a | n/a | n/a | n/a | n/a | n/a |
| 3 | 2 | 7 | 7 | 0 | 12 | 2 | n/a | n/a | n/a |

As can be seen in Table 4, the configured parameters associated with index values 0 and 1 are incompatible with a cross-slot scheduling scheme, since they indicate an allocation of communications resources within the same timeslot as the PDCCH transmission. Accordingly, replacement parameters having $K_0=1$ are defined for those index values where cross-slot scheduling is activated.

TDRA Delay Parameters

As described above, in accordance with conventional techniques, each row of a TDRA table may be associated with a $K_0$ parameter which indicates a timeslot within which the allocated PDSCH communications resources begin, and an S parameter which indicates an offset from the beginning of the timeslot, measured in OFDM symbol periods.

However, it has been recognised that a $K_0$ value indicating that the allocated PDSCH communications resources begin in a slot after that in which the PDCCH transmission occurs (i.e. $K_0$ equal to 1 or greater) may not be suitable for a power saving scheme which is suited for low latency data transmission, such as that described herein which defines a PDSCH time window end.

Accordingly, in some embodiments, the parameter $K_0$ is defined to indicate a delay in units of less than one timeslot. For example, in some embodiments, the $K_0$ parameter indicates a number of symbol periods.

In some embodiments of the present technique, a parameter associated with a row of a TDRA table may indicate a start offset relative to one of the start of the PDCCH, the end of the PDCCH, the earliest start time of any possible PDCCH transmission within the PDCCH search space, and the latest end time of any possible PDCCH transmission within the PDCCH search space. The start offset may be indicated in units of OFDM symbols.

For example, the parameter may indicate a number of OFDM symbol periods between the start of a PDCCH transmission and the start of the allocated PDSCH communications resources.

In some embodiments, instead of a 'slot' parameter (such as $K_0$) and a 'symbol' parameter (such as S), only a single parameter (which may be referred to as $K_0'$ or S') is used to indicate a delay between a reference time point and a start time of the allocated resources.

Figure 9:
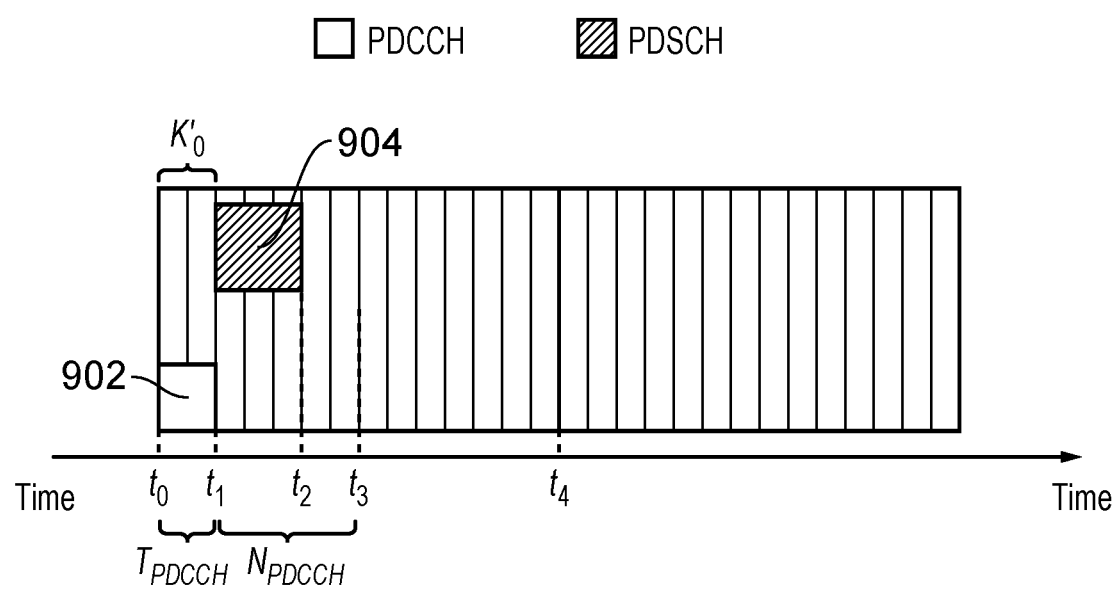
FIG. 9 illustrates an example of downlink communications resources allocated by means of a downlink control channel transmission in accordance with embodiments of the present technique.

FIG. 9 shows an example of downlink communications resources 904 allocated by means of a PDCCH transmission 902 in accordance with embodiments of the present technique. The PDCCH transmission 902 starts at time t0. The PDCCH transmission 902 comprises DCI which indicates a TDRA index to a row of a configured TDRA table. In the example of FIG. 9, the indicated table row is associated with a $K_0'$ value of 2, which indicates that the PDSCH communications resources 904 begin 2 OFDM symbols after time t0 (the start time of the PDCCH), i.e. at time t1.

Since URLLC has a low latency requirement, large $K_0$ values in the TDRA table are unlikely to be used and hence it more beneficial to use a smaller granularity indicator. For power saving purposes, the value of $K_0$ is also limited in order to ensure PDSCH ends within a predetermined time period after the start of the PDCCH i.e. by the PDSCH time window end.

In some embodiments, the TDRA table for uplink (e.g. PUSCH) communications resource assignments provides a $K_0'$ parameter as described above.

Figure 10:
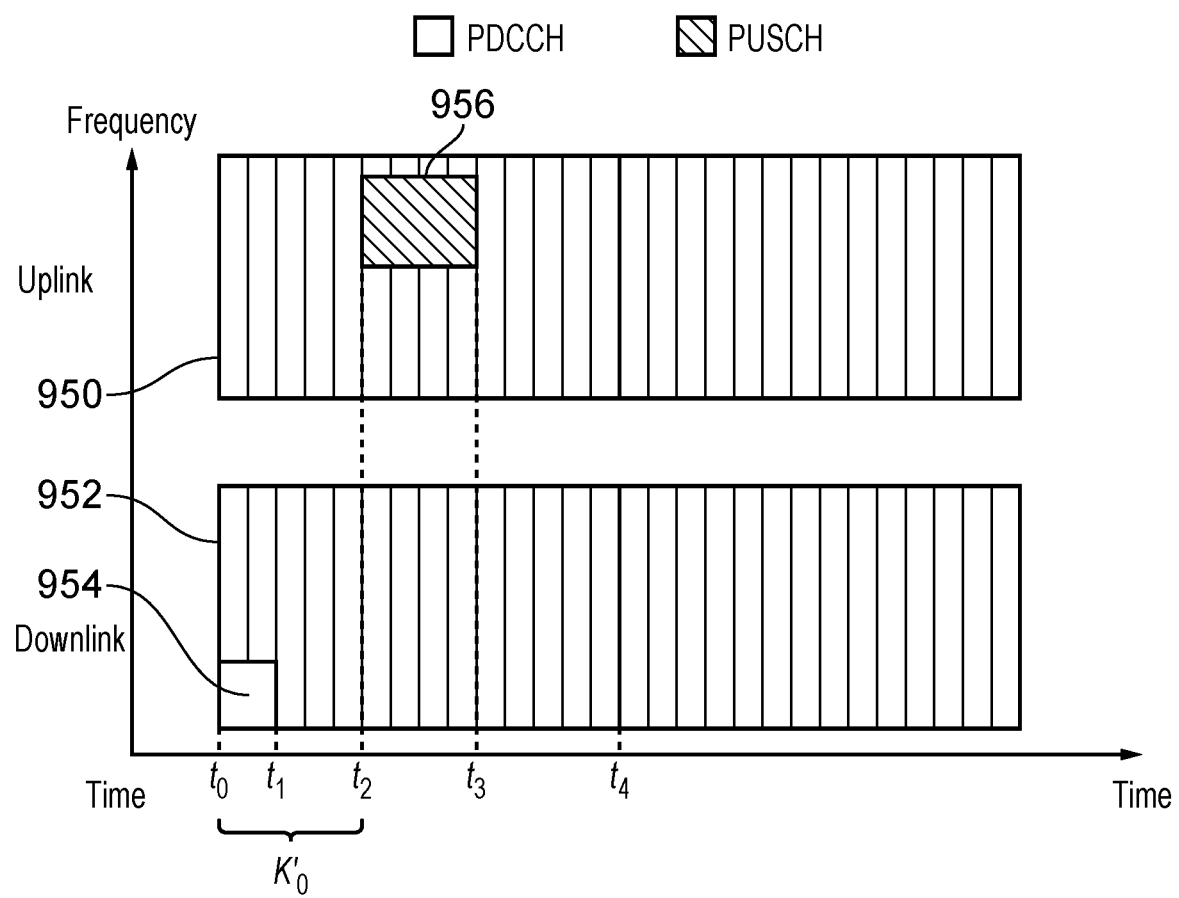
FIG. 10 illustrates an allocation of uplink communications resources in accordance with embodiments of the present technique.

FIG. 10 illustrates an allocation of uplink communications resources in accordance with embodiments of the present technique. In FIG. 10, uplink communications resources 950 and downlink communications resources 952 of a wireless access interface are shown.

A PDCCH transmission 954 is shown from time t0 to time t1, which may be in accordance with a PDCCH search space.

The communications device 270 is configured with a TDRA table in which the delay from the start of the PDCCH transmission 954 to a start of allocated PDSCH resources is indicated, by means of a $K_0'$ parameter, in units of OFDM symbol periods. An example of such a table is shown in Table 5.

TABLE 5

TDRA entries for PUSCH

| TDRA Index | $K_0'$ | L |
|---|---|---|
| 0 | 0 | 4 |
| 1 | 5 | 4 |
| 2 | 0 | 2 |
| 3 | 5 | 2 |

The PDCCH transmission 954 comprises DCI indicating a TDRA table index, which in the example of FIG. 10 and Table 5 is index 1. According to the TDRA table shown in Table 5, an index of 1 corresponds to a $K_0'$ value of 5. Accordingly, allocated PUSCH resources 956 start at time t2 (being 5 OFDM symbols after the start of the PDCCH transmission) and have a duration of 4 OFDM symbols.

In some embodiments, as shown in the example of Table 5, a row of the TDRA table which is associated with a $K_0'$ parameter is not associated with any S parameter, or any associated S parameter is not used to indicate or determine the PDSCH or PUSCH resources.

If, as in some embodiments, a row of the TDRA table is associated with an S parameter providing an indication of a delay in symbols from a reference time to a PDSCH resource start time, then in some embodiments such a row is not associated with any $K_0$ parameter, or any associated $K_0$ parameter is not used to indicate or determine the PDSCH resources.

PDSCH Time Window Start

As described above, in some embodiments of the present technique, a PDSCH time window end is defined, according to which the infrastructure equipment 272 schedules a PDSCH transmission to end at or prior to the PDSCH time window end, and the communications device 270 may disable part or all of its receiver 292 after the PDSCH time window end, even if it has not completed decoding of a corresponding PDCCH transmission (or potential PDCCH transmission).

In some embodiments, in addition or alternatively, a PDSCH time window start is defined. According to such embodiments, the infrastructure equipment 272 schedules a PDSCH transmission to begin no sooner than the PDSCH time window start, and the communications device 270 may disable part or all of its receiver 292 prior to the PDSCH time window start.

In some embodiments, the PDSCH time window start may occur prior to the start of the PDCCH transmission.

In some embodiments, the PDSCH time window start may occur between the start of the PDCCH transmission and the end of the PDCCH transmission.

In some embodiments, the PDSCH time window start may occur after the end of the PDCCH transmission. In such embodiments, prior to the PDSCH time window start, the communications device 270 may configure its receiver to receive signals which may be used for the PDCCH transmission in accordance with the PDCCH search space. Because the PDCCH transmission may use a narrower bandwidth (i.e. fewer resources when measured in the frequency domain), power consumption associated with receiving signals which may be used for the PDCCH transmission in accordance with the PDCCH search space may be lower than a power consumption associated with receiving signals which may be used for a PDSCH transmission.

Where both a PDSCH time window start and a PDSCH time window end are defined, the PDSCH time window start occurs prior to the PDSCH time window end.

Figure 11:
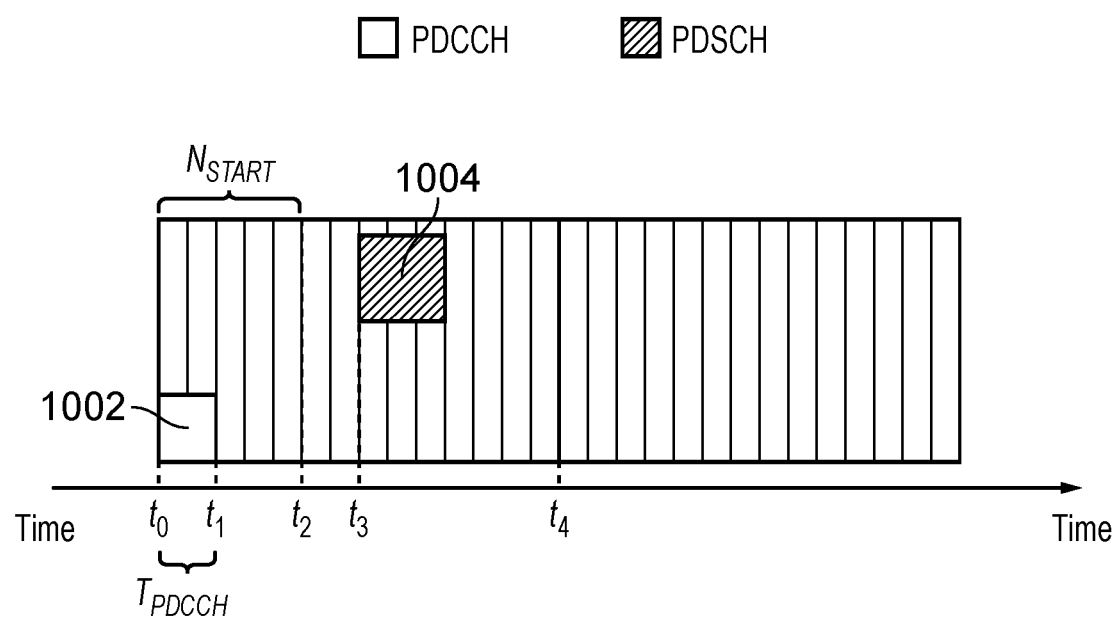
FIG. 11 shows an example of a scheduled downlink shared channel transmission in accordance with embodiments of the present technique.

FIG. 11 shows an example of a scheduled PDSCH transmission in accordance with embodiments of the present technique.

In the example of FIG. 11, a DL Grant within a DCI 1002 transmitted on a PDCCH starts at time t0 and ends at time t1. The PDSCH time window start is determined based on a predetermined parameter $N_{START}$. Accordingly, the PDSCH time window start occurs at time t2, which is $N_{START}$ symbols after the start of the PDCCH 1002. During the time between t1 and t2, the communications device 270 may disable part or all of its RF receiver for receiving and buffering of downlink signals, since the communications device 270 does not expect any PDSCH communications resources to be allocated before time t2. Examples of disabling part or all of the RF receiver chain may include turning off certain oscillators, clock sources, analogue to digital conversion circuits and/or amplifiers within the receiver 292. It may additionally or alternatively comprise operating the RF receiver chain at a lower operating voltage, leading to a performance degradation of the RF receiver chain. In any case, power consumption associated with the receiver 292 may be lowered as a result of disabling the parts or all of the RF receiver chain and/or operating the RF receiver chain at the lower operating voltage.

In the example of FIG. 11, PDSCH communications resources 1004 are allocated starting at time t3, i.e. no earlier than the PDSCH time window start at time t2.

In some embodiments, the configured TDRA table may comprise rows which indicate PDSCH resources which start prior to the PDSCH time window start. In some embodiments, the PDSCH time window start takes precedence over these rows. That is, instead of controlling the receiver 290 to receive and buffer signals which may comprise allocated PDSCH resources, based on the allocations which may be indicated by means of an index to a row of the TDRA table, the communications device 270 controls its receivers 290 based on the PDSCH time window start.

Accordingly, one or more of the TDRA table rows which indicate PDSCH resources which start prior to the PDSCH time window start may be determined to be inapplicable by the communications device 290 and/or by the infrastructure equipment 272.

Following the same principle described above in the context of the PDSCH time window end, parameters associated with one or more of the TDRA rows which are determined to be inapplicable based on the determined PDSCH time window start may be adapted in accordance with predetermined rules, such that the associated TDRA row index instead corresponds to parameters indicating PDSCH communications resources which are compliant with (i.e. do not start before) the determined PDSCH time window start.

An indication of a predetermined parameter by which the PDSCH time window start can be determined (such as the $N_{START}$ parameter described above) may be transmitted by the infrastructure equipment 272 to the communications device 270 using one or more of RRC signalling, MAC signalling, or DCI signalling.

In the case of the indication by DCI signalling, an indication of the $N_{START}$ value can be included within a different DCI from a DCI scheduling the PDSCH to which the $N_{START}$ value is applicable. The DCI comprising the $N_{START}$ indication can be transmitted prior to a DCI scheduling the PDSCH, e.g. in a previous slot.

In some embodiments, the PDSCH time window start may correspond to the end of the PDCCH transmission. For example, the $N_{START}$ parameter may be equal to $T_{PDCCH}$, where $T_{PDCCH}$ is the transmission time of the PDCCH transmission.

In the example of FIG. 11, the PDSCH time window start is at time t2. According to conventional techniques, the PDCCH transmission 1002 may allocate PDSCH communications resources starting at the first symbol of the same timeslot in which the PDCCH transmission 1002 occurs, i.e. at time t0. However, in accordance with embodiments of the present technique, from time t0 until t1, in accordance with the PDCCH search space, the communications device 270 is required to receive only signals which may correspond to the PDCCH transmission 1002.

This means that, at least between time t0 and time t1, the UE may operate its receiver 292 in a manner sufficient to receive the PDCCH. This manner may be associated with a lower power consumption than a manner in which reception of PDSCH signals is possible. For example, the receiver 292 may be configured to receive using only a narrow bandwidth for PDCCH between t0 and t1, thereby reducing the power consumption of the communications device 270. Furthermore, where the PDSCH time window start occurs after the end of the PDCCH transmission (as in the example of FIG. 11), the communications device 270 may disable part or all of its receiver 290 during the time period between the end of the PDCCH transmission 1002 and the PDSCH time window start, i.e. between time t1 and t2 in the example of FIG. 11.

In other examples, the receiver may be configured to operate to receive PDCCH signals using a smaller number of receive antennas or MIMO layers than would be required to receive PDSCH signals, thus saving power.

In some embodiments, the infrastructure equipment 272 determines that the communications device 270 configures its receiver 292 to operate in a different manner when receiving PDCCH signals, as described above, and adapts the scheduling and/or transmission of PDCCH signals accordingly, in order to ensure the reliable reception of messages (such as DCI) via the PDCCH. For example, the infrastructure equipment 272 may determine an effective signal to noise ratio (SNR) at the communications device 270, taking into account (for example) the number of receive antennas used by the communications device 270, and apply a suitable level of redundancy to the PDCCH transmissions.

In some embodiments, the PDSCH time window start is determined implicitly based on the PDCCH processing time $N_{PDCCH}$ mentioned above. The PDCCH processing time $N_{PDCCH}$ may be implicitly determined by the infrastructure equipment 272 based on a maximum number of blind decoding attempts that may be required by the communications device 270 to successfully decode the PDCCH transmission (or to determine that no PDCCH transmission has occurred in accordance with the PDCCH search space). Because the infrastructure equipment 272 configures the PDCCH search space, it is able to determine the maximum number of blind decoding attempts that may be required. The PDCCH processing time $N_{PDCCH}$ for the communications device 270 may be determined in accordance with a predetermined mapping which may be based on a capability of the communications device 270. The PDCCH processing time is an example of a decoding delay. A maximum decoding delay may be a maximum time that the communications device 270 requires to decode a message (such as DCI) transmitted using the PDCCH, and may be signalled as a capability of the communications device, be derived from a capability of the communications device and/or be pre-configured at both the communication device and the infrastructure equipment in accordance with a standards specification.

For example, if the maximum number of blind decoding attempts is 22 (respectively 44), then in accordance with such a mapping, the PDCCH processing time $N_{PDCCH}$ may be determined to be 2 (respectively 4) symbols.

In some embodiments, one or more of the methods for determining $N_{PDCCH}$ described above in the context of determining the PDSCH time window end may be used.

UE Process Flowchart

Figure 12:
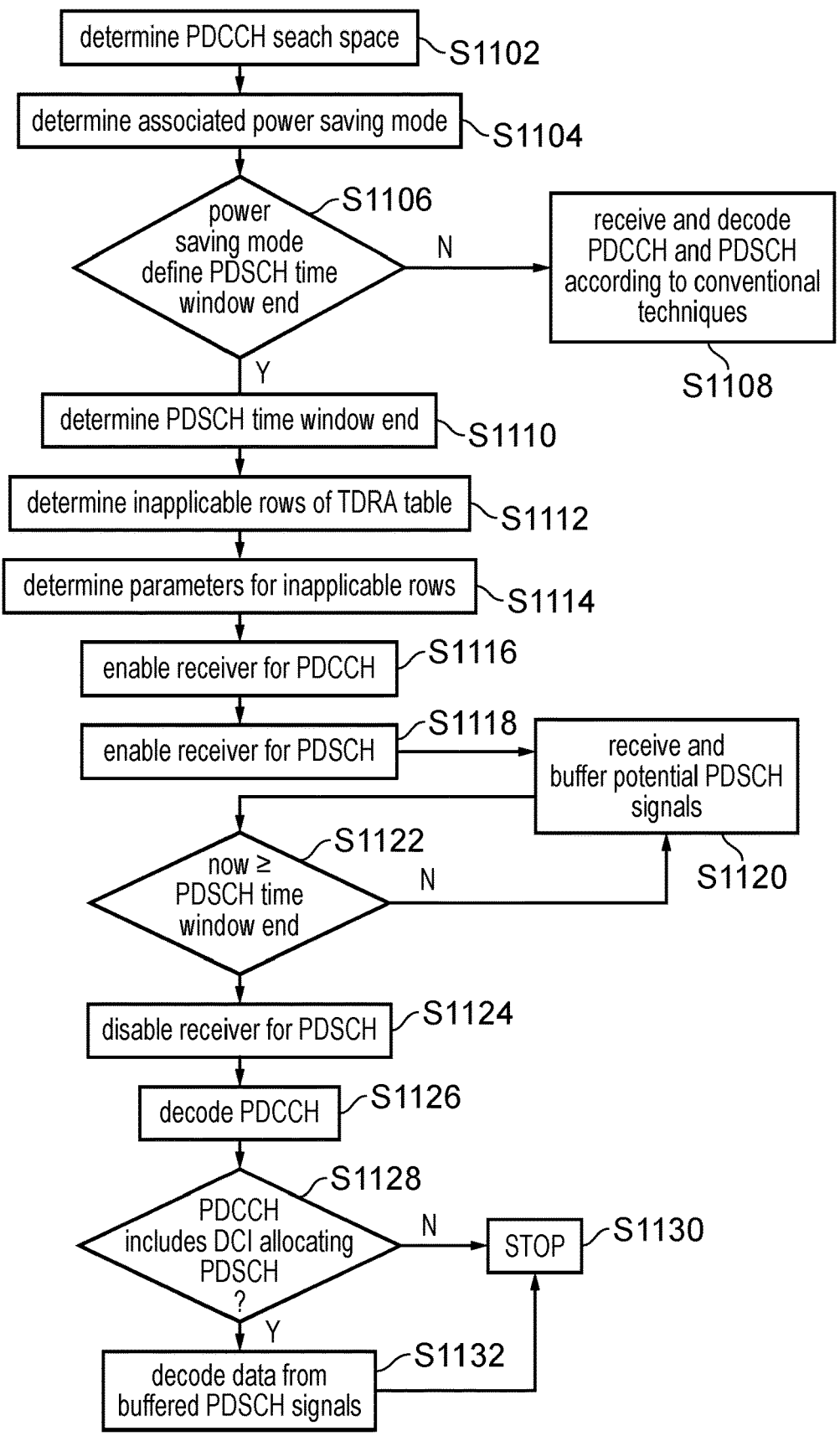
FIG. 12 illustrates a flowchart for a process of receiving data by a communications device from an infrastructure equipment in accordance with embodiments of the present technique.

FIG. 12 illustrates a flowchart for a process of receiving data by the communications device 270 from the infrastructure equipment 272 in accordance with embodiments of the present technique.

The process starts at step S1102 in which the communication device 270 determines a PDCCH search space, which characterises communication resources on which a downlink control information may be transmitted by the infrastructure equipment 272. The downlink control information may indicate allocated downlink communication resources for the transmission of data to the communications device 270.

Control then passes to step S1104, in which the communications device 270 determines whether a power saving mode is associated with the PDCCH search space. Control then passes to step S1106, in which the communications device 270 determines whether the power saving mode determined in step S1104 defines a PDSCH time window end.

If, at step S1106, it is determined that the power saving mode associated with the PDCCH search space does not define a PDSCH time window end, then control passes to S1108 in which the communications device 270 uses conventional techniques to receive the PDCCH transmission and to determine if a PDSCH transmission is scheduled. Furthermore if it is determined that a PDSCH transmission is scheduled then in step S1108, the communications device 270 receives the signals associated with the PDSCH and decodes them in accordance with conventional techniques. The process then ends.

If, at step S1106, it is determined that the power saving mode defines a PDSCH time window end, then control passes to step S1110, in which the communications device 270 determines the PDSCH time window end associated with the PDCCH search space. As described above, the PDSCH time window end may be determined by reference to the start of the PDCCH transmission, the end of the PDCCH transmission or the start or end of the communications resources within which the PDCCH transmission may occur.

Control passes then to step S1112, in which the communications device 270 determines whether one or more rows of the TDRA table are inapplicable based on the end time of PDSCH communication resources as indicated by the configured TDRA table, and based on the determined PDSCH time window end.

Control then passes to step S1114, in which the communications device 270 determines adapted parameters for any inapplicable TDRA rows, the adapted parameters being compliant with the determined PDSCH time window end.

Control then passes to step S1116, in which the communications device 270 controls its receiver 292 to receive signals transmitted using communication resources associated with the PDCCH search space, in which the downlink control information may be transmitted.

In step S1118, the communications device 270 controls its receiver 292 to receive signals transmitted on communication resources on which a PDSCH transmission to the communications device 270 may occur in accordance with the determined PDSCH time window end parameter and the parameters associated with the rows of the TDRA table. The parameters associated with the rows of the TDRA table may be those of the configured table, which have been determined to be applicable in step S1112, or may be parameters which have been adapted in step S1114.

Control then passes to step S1120, in which the communications device 270 controls its receiver to buffer signals received which may comprise a PDSCH transmission. Control then passes to step S1122, in which the communications device 270 determines whether the PDSCH time window end determined at step S1110 has passed. If the PDSCH time window end has not passed, then control returns to step S1120.

If at step S1122 it is determined that the PDSCH time window end has passed, then control passes to step S1124. At step S1124, the communications device 270 may control its receiver 292 to terminate reception of signals, based on the determination that the PDSCH time window has now passed, and therefore that in accordance with the PDSCH time window end, the infrastructure equipment 272 is no longer transmitting a PDSCH transmission to the communications device 270.

As described above, because of the requirement for the communications device 270 to perform blind decoding of signals associated with the PDCCH search space, the communications device 270 is required to receive and buffer signals which may be corresponding to a PDSCH transmission to the communications device while the decoding of the PDCCH signals is taking place.

Accordingly, at step S1126 the communications device 270 decodes the signals which were received in accordance with the enabling of the receiver 292 at step S1116. That is, the communications device 270 attempts to blind decode a PDCCH transmission comprising downlink control information transmitted to the communications device in accordance with the PDCCH search space determined at step S1102.

At step S1128, the communications device 270 determines whether the signals received in accordance with the PDCCH search space and blindly decoded at step S1126 include downlink control information allocating communication resources on the PDSCH for the communication of data by the infrastructure equipment 272 to the communications device 270. If it is determined that no such PDSCH allocation has occurred, for example because no downlink control information has been transmitted, then control passes to step S1130 and the process ends.

If it is determined at step S1128 that downlink control information was transmitted by the infrastructure equipment to the communications device allocating communication resources on the PDSCH, then control passes to step S1132, in which the communications device 270 decodes data from the signals which were received and buffered in step S1118 and step S1120. Control then passes to step S1130 and the process ends.

gNB Process

Figure 13:
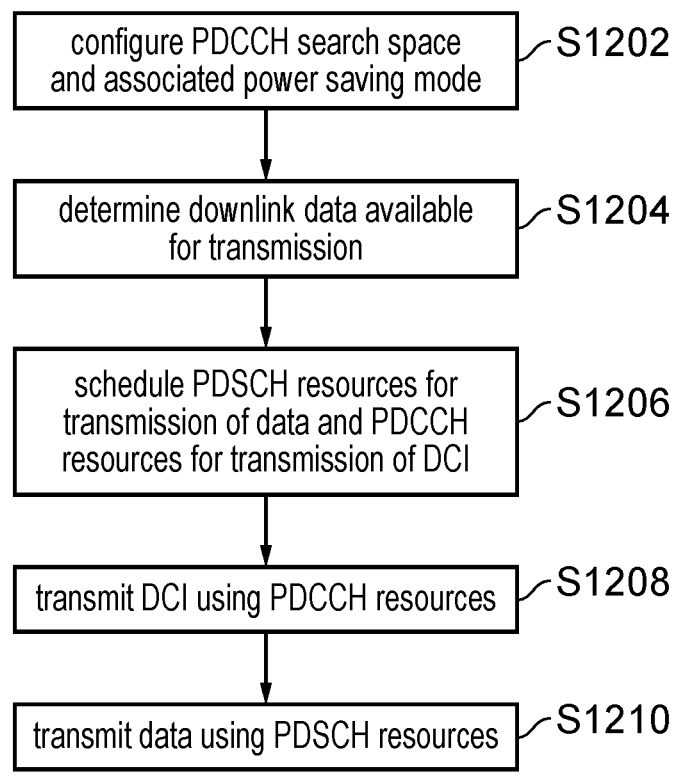
FIG. 13 illustrates a flowchart for a process of transmitting data to a communications device by an infrastructure equipment in accordance with embodiments of the present technique.

In accordance with embodiments of the present technique, a corresponding process is described for the infrastructure equipment 272 and illustrated in FIG. 13.

The process starts at step S1202 in which the infrastructure equipment 272 configures a PDCCH search space and associated power saving mode for the communications device 270. This step may comprise transmitting, for example in RRC signalling, an indication of the PDCCH search space parameters, an indication of the associated power saving mode and an indication of parameters associated with the power saving mode. For example, the associated power saving mode may be one which defines both a PDSCH time window start and a PDSCH time window end, for each PDSCH allocated by means of DCI transmitted in accordance with the PDCCH search space. Accordingly, the parameters associated with the power saving mode may comprise an $N_{START}$ parameter and an $N_{END}$ parameter.

The process continues with step S1204 in which the infrastructure equipment 272 determines that it has downlink data for transmission to the communications device 270.

At step S1206, the infrastructure equipment allocates PDSCH communications resources for the transmission of the data and allocates PDCCH communications resources for transmission of DCI indicating the allocated PDSCH communications resources. The infrastructure equipment ensures that the PDCCH communications resources are in accordance with the PDCCH search space configured in step S1202, and that the PDSCH communications resources are compliant with the power saving mode and associated parameters. For example, the infrastructure equipment 272 may ensure that the PDSCH communications resources do not start prior to the PDSCH time window start (in accordance with the $N_{START}$ parameter) and do not extend beyond the PDSCH time window end (in accordance with the $N_{END}$ parameter).

In step S1208 the infrastructure equipment 272 transmits the DCI using the determined PDCCH communications resources, and at step S1210, the infrastructure equipment 272 transmits the downlink data using the determined PDSCH communications resources.

In some embodiments, the infrastructure equipment 272 may configure PDCCH search spaces, power saving modes and associated parameters for multiple communications devices. In some embodiments, these are configured so that the corresponding PDSCH time windows do not overlap, or overlap to a minimal extent. In some embodiments, this may comprise configuring PDCCH search spaces for different communications devices such that the PDCCH search spaces start at different time and/or do not overlap. Accordingly, embodiments of the present technique provide for power saving techniques to be implemented in respect of multiple communications devices while ensuring efficient usage of PDSCH and/or PDCCH communications resources.

It will be appreciated that within the scope of the present disclosure, the processes illustrated in FIG. 12 and in FIG. 13 and described above may be adapted by means of the modification, addition, removal or re-ordering of one or more steps. For example, where the configured TDRA table indicates that allocated PDSCH may start earlier than the beginning of the PDCCH transmission, the order of steps S1116 and S1118 may be reversed. Similarly, step S1126 may be carried out in parallel with one or more of steps S1118, S1120, S1122 and S1124.

Aspects of embodiments described herein may be combined in manners not otherwise explicitly described. For example, in some embodiments, the PDSCH time window may be characterised by both a PDSCH time window start, as described herein, and by a PDSCH time window end, as described above. Accordingly, the infrastructure equipment 272 may schedule the transmission of DCI scheduling resources on a shared channel such as a PDSCH, wherein the shared channel resources are compliant with (i.e. do not extend beyond) the PDSCH time window start or the PDSCH time window end.

Similarly, the communications device 270 may control its receiver 292 (and in particular its RF receiver chain) to receive signals of the shared channel after the PDSCH time window start and before the PDSCH time window end, and to operate its receiver 292 in a lower power mode of operation before and after the PDSCH time window.

Thus there has been described a method for receiving data by a communications device from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the first and the second downlink communications resources are within a time period of the wireless access interface which ends at a pre-configured end time, the pre-configured end time being before the downlink control message is decoded.

There has also been described a method for receiving data by a communications device from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the second downlink communications resources are within a time period of the wireless access interface which starts at a pre-configured start time, the pre-configured start time being before the downlink control data is decoded and after the first downlink communications resources.

Corresponding communications devices, infrastructure equipment and methods therefore, and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type of communications device operating with a wireless link to the communication network.

It will further be appreciated that the principles described herein are not applicable only to LTE-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for receiving data by a communications device from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the first and the second downlink communications resources are within a time period of the wireless access interface which ends at a pre-configured end time, the pre-configured end time being before the downlink control message is decoded.

Paragraph 2. A method according to paragraph 1, wherein the decoding starts after an end of the first downlink communications resources.

Paragraph 3. A method according to paragraph 1 or paragraph 2, wherein the decoding starts after the first downlink communications resources begin.

Paragraph 4. A method according to any of paragraphs 1 to 3, the method comprising controlling a receiver of the communications device to receive signals during the time window and controlling the receiver to operate with a reduced power consumption after the pre-configured end time.

Paragraph 5. A method according to paragraph 4 wherein controlling the receiver to operate with a reduced power consumption comprises disabling one or more radio frequency (RF) components within the receiver.

Paragraph 6. A method according to any of paragraphs 1 to 5, wherein the pre-configured end time is a predetermined duration after the end of the first downlink communications resources.

Paragraph 7. A method according to any of paragraphs 1 to 6, wherein the pre-configured end time is before a maximum decoding delay for decoding the downlink control message after the end of the first downlink communications resources.

Paragraph 8. A method according to any of paragraphs 1 to 5, wherein the pre-configured end time is a predetermined duration after the start of the first downlink communications resources.

Paragraph 9. A method according to any of paragraphs 1 to 8, wherein the downlink control message comprises an indication of an index value of a predetermined table, the predetermined table comprising a plurality of index values and, for each of the plurality of index values, an indication of communications resources, and the second downlink communications resources are associated with the index value indicated by the downlink control message.

Paragraph 10. A method according to any of paragraphs 1 to 9, wherein the pre-configured end time is a latest end time of any communications resources associated with an index value of the predetermined table.

Paragraph 11. A method according to paragraph 9, the method comprising receiving an indication that one or more index values of the predetermined table are deactivated, wherein the pre-configured end time is a latest end time of any communications resources associated with an index value of the predetermined table which is not deactivated.

Paragraph 12. A method according to any of paragraphs 9 to 11, the method comprising receiving an indication that the predetermined table is activated, wherein the predetermined table is one of a plurality of predetermined tables.

Paragraph 13. A method according to any of paragraphs 1 to 9, wherein the downlink control message comprises an indication of an index value of a predetermined table, the predetermined table comprising a plurality of index values and, for each of the plurality of index values, an indication of communications resources, the method comprising determining that the communications resources associated with the index value indicated by the downlink control message end after the pre-configured end time, and determining the second communications resources based on the index value indicated by the downlink control message in accordance with a predetermined rule for adapting the communications resources which are associated with an index value indicated by a downlink control message and which end after the pre-configured end time.

Paragraph 14. A method according to any of paragraphs 9 to 13, wherein each index value of the predetermined table is associated with a delay value, the delay value indicating a number of orthogonal frequency division multiplexing (OFDM) symbol periods between a start of the first downlink communications resources and a start of the second downlink communications resources.

Paragraph 15. A method according to any of paragraphs 1 to 14, the method comprising: determining that a first power-saving mode is in operation, wherein according to the first power-saving mode, the pre-configured end time is no later than a maximum decoding delay for decoding the downlink control message after the end of the first downlink communications resources.

16. A method according to paragraph 15, the method comprising determining the pre-configured end time in response to determining that the first power-saving mode is in operation.

Paragraph 17. A method according to paragraph 15 or paragraph 16, wherein the first downlink communications resources are determined in accordance with a predetermined schedule defining a plurality of downlink communications resources which may be used for the transmission of downlink control messages to the communications device.

Paragraph 18. A method according to paragraph 17, wherein the predetermined schedule comprises a physical downlink control channel (PDCCH) search space.

Paragraph 19. A method according to paragraph 17 or paragraph 18, wherein the predetermined schedule is associated with the first power saving mode.

Paragraph 20. A method according to any of paragraphs 15 to 19, the method comprising receiving radio resource control signalling, the radio resource control signalling comprising an indication indicating that the first power saving mode is in operation.

Paragraph 21. A method according to any of paragraphs 15 to 20, the method comprising receiving medium access control signalling, the medium access control signalling comprising an indication indicating that the first power saving mode is in operation.

Paragraph 22. A method according to any of paragraphs 15 to 21, the method comprising receiving a second downlink control message, the second downlink control message comprising an indication that the first power-saving mode is in operation.

Paragraph 23. A method according to any of paragraphs 1 to 22, wherein the time period starts earlier than the first downlink communications resources.

Paragraph 24. A method according to any of paragraphs 1 to 22, the method comprising determining a pre-configured start time of a second time period within the time period, the second downlink communications resources being within the second time period, the pre-configured start time being before the downlink control data is decoded and after the first downlink communications resources.

Paragraph 25. A method according to paragraph 24, the method comprising controlling the receiver of the communications device to stop receiving signals after the end of the first downlink communications resources, and controlling the receiver of the communications device to receive signals after the pre-configured start time of the second time period.

Paragraph 26. A method according to paragraph 24 or paragraph 25, wherein the pre-configured start time of the second time period is a predetermined start time delay after the start of the first downlink communications resources.

Paragraph 27. A method according to paragraph 26, the method comprising receiving an indication of the predetermined start time delay.

Paragraph 28. A method according to paragraph 26 or paragraph 27, wherein the predetermined start time delay is equal to a duration of the first communications resources.

Paragraph 29. A method according to any of paragraphs 1 to 28, wherein the downlink control message is transmitted in a first manner allowing reception using less power consumption, and the downlink data is transmitted in a second manner that requires more power consumption than used to receive the first downlink communications resources.

Paragraph 30. A method according to paragraph 29 wherein the first manner comprises transmitting over a first bandwidth, and the second manner comprises transmitting over a second bandwidth having a greater range than the first bandwidth.

Paragraph 31. A method according to paragraph 29 or paragraph 30 whereby in accordance with the first manner, one or more transmission parameters are determined based on a reception by the communications device using a first number of receive antennas, and in accordance with the second manner, the one or more transmission parameters are determined based on a reception by the communications device using a second number of receive antennas greater than the first number.

Paragraph 32. A method for receiving data by a communications device from a wireless communications network, the method comprising: receiving a downlink control message transmitted in first downlink communications resources of a wireless access interface provided by the wireless communications network, the downlink control information providing an indication of second downlink communications resources from which the communications device can receive downlink data, decoding the downlink control message to identify the second downlink communications resources for receiving the downlink data, and receiving the downlink data from the second downlink communications resources, wherein the second downlink communications resources are within a time period of the wireless access interface which starts at a pre-configured start time, the pre-configured start time being before the downlink control data is decoded and after the first downlink communications resources.

Paragraph 33. A method for transmitting data to a communications device in a wireless communications network, the method comprising: transmitting a downlink control message in first downlink communications resources of a wireless access interface provided by the wireless communications network, the downlink control information providing an indication of second downlink communications resources from which the communications device can receive downlink data, and transmitting the downlink data using the second downlink communications resources, wherein the first and the second downlink communications resources are within a time period of the wireless access interface which ends at a pre-configured end time, the pre-configured end time being before the downlink control message is decoded by the communications device.

Paragraph 34. A method according to paragraph 33, the method comprising transmitting a second downlink control message in third downlink communications resources of the wireless access interface, the second downlink control information providing an indication of fourth downlink communications resources from which another communications device can receive second downlink data, and transmitting the second downlink data using the fourth downlink communications resources, wherein the third downlink communications resources and the fourth downlink communications resources are within a third time period of the wireless access interface which ends at a second pre-configured end time, the pre-configured end time being before the downlink control message is decoded by the other communications device, the time period and the third time period being non-overlapping.

Paragraph 35. A method according to paragraph 34, wherein the first downlink communications resources are determined in accordance with a first predetermined schedule defining a first plurality of downlink communications resources which may be used for the transmission of downlink control messages to the communications device, the third downlink communications resources are determined in accordance with a second predetermined schedule defining a second plurality of downlink communications resources which may be used for the transmission of downlink control messages to the other communications device, and the first plurality of downlink communications resources and the second plurality of downlink communications resources do not overlap in time.

Paragraph 36. A method according to paragraph 35, the method comprising: transmitting an indication of the first predetermined schedule to the communications device, and transmitting an indication of the second predetermined schedule to the other communications device.

Paragraph 37. A method for transmitting data to a communications device in a wireless communications network, the method comprising: transmitting a downlink control message in first downlink communications resources of a wireless access interface provided by the wireless communications network, the downlink control information providing an indication of second downlink communications resources from which the communications device can receive downlink data, and transmitting the downlink data using the second downlink communications resources, wherein the second downlink communications resources are within a time period of the wireless access interface which starts at a pre-configured start time, the pre-configured start time being before the downlink control data is decoded and after the first downlink communications resources.

Paragraph 38. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a downlink control message transmitted in first downlink communications resources of the wireless access interface, the downlink control information providing an indication of second downlink communications resources from which the communications device can receive downlink data, to decode the downlink control message to identify the second downlink communications resources for receiving the downlink data, and to receive the downlink data from the second downlink communications resources, wherein the first and the second downlink communications resources are within a time period of the wireless access interface which ends at a pre-configured end time, the pre-configured end time being before the downlink control message is decoded.

Paragraph 39. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a downlink control message transmitted in first downlink communications resources of the wireless access interface, the downlink control information providing an indication of second downlink communications resources from which the communications device can receive downlink data, to decode the downlink control message to identify the second downlink communications resources for receiving the downlink data, and to receive the downlink data from the second downlink communications resources, wherein the first and the second downlink communications resources are within a time period of the wireless access interface which ends at a pre-configured end time, the pre-configured end time being before the downlink control message is decoded.

Paragraph 40. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a downlink control message transmitted in first downlink communications resources of the wireless access interface, the downlink control information providing an indication of second downlink communications resources from which the communications device can receive downlink data, to decode the downlink control message to identify the second downlink communications resources for receiving the downlink data, and to receive the downlink data from the second downlink communications resources, wherein the second downlink communications resources are within a time period of the wireless access interface which starts at a pre-configured start time, the pre-configured start time being before the downlink control data is decoded and after the first downlink communications resources.

Paragraph 41. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a downlink control message transmitted in first downlink communications resources of the wireless access interface, the downlink control information providing an indication of second downlink communications resources from which the communications device can receive downlink data, to decode the downlink control message to identify the second downlink communications resources for receiving the downlink data, and to receive the downlink data from the second downlink communications resources, wherein the second downlink communications resources are within a time period of the wireless access interface which starts at a pre-configured start time, the pre-configured start time being before the downlink control data is decoded and after the first downlink communications resources.

Paragraph 42. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a downlink control message in first downlink communications resources of the wireless access interface, the downlink control information providing an indication of second downlink communications resources from which the communications device can receive downlink data, and to transmit the downlink data using the second downlink communications resources, wherein the first and the second downlink communications resources are within a time period of the wireless access interface which ends at a pre-configured end time, the pre-configured end time being before the downlink control message is decoded by the communications device.

Paragraph 43. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a downlink control message in first downlink communications resources of the wireless access interface, the downlink control information providing an indication of second downlink communications resources from which the communications device can receive downlink data, and to transmit the downlink data using the second downlink communications resources, wherein the first and the second downlink communications resources are within a time period of the wireless access interface which ends at a pre-configured end time, the pre-configured end time being before the downlink control message is decoded by the communications device.

Paragraph 44. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a downlink control message in first downlink communications resources of the wireless access interface, the downlink control information providing an indication of second downlink communications resources from which the communications device can receive downlink data, and to transmit the downlink data using the second downlink communications resources, wherein the second downlink communications resources are within a time period of the wireless access interface which ends at a pre-configured start time, the pre-configured start time being before the downlink control data is decoded and after the first downlink communications resources.

Paragraph 45. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a downlink control message in first downlink communications resources of the wireless access interface, the downlink control information providing an indication of second downlink communications resources from which the communications device can receive downlink data, and to transmit the downlink data using the second downlink communications resources, wherein the second downlink communications resources are within a time period of the wireless access interface which ends at a pre-configured start time, the pre-configured start time being before the downlink control data is decoded and after the first downlink communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] 3GPP TS 38.214 "NR; Physical layer procedures for data (Release 15)", version 15.2.0
[5] 3GPP TS 38.300 v. 15.4.0 "NR; NR and NG-RAN Overall Description; Stage 2 (Release 15)"
[6] 3GPP TS 38.825

[7] RP-190727, "New WID: UE Power Saving in NR", CATT, CAICT, 3GPP RAN #83

What is claimed is:

1. A method for receiving data by a communications device from a wireless communications network, the method comprising:
   receiving a downlink control message transmitted in first downlink communications resources of a wireless access interface provided by the wireless communications network, the downlink control information providing an indication of second downlink communications resources from which the communications device can receive downlink data,
   decoding the downlink control message to identify the second downlink communications resources for receiving the downlink data, and
   receiving the downlink data from the second downlink communications resources,
   wherein the first and the second downlink communications resources overlap and are within a time period of the wireless access interface which ends at a pre-configured end time, the pre-configured end time being before the downlink control message is decoded.

2. A method according to claim 1, wherein the decoding starts after an end of the first downlink communications resources.

3. A method according to claim 1, wherein the decoding starts after the first downlink communications resources begin.

4. A method according to claim 1, the method comprising
   controlling a receiver of the communications device to receive signals during the time window and
   controlling the receiver to operate with a reduced power consumption after the pre-configured end time.

5. A method according to claim 4, wherein controlling the receiver to operate with a reduced power consumption comprises disabling one or more radio frequency (RF) components within the receiver.

6. A method according to claim 1, wherein the pre-configured end time is a predetermined duration after the end of the first downlink communications resources.

7. A method according to claim 1, wherein the pre-configured end time is before a maximum decoding delay for decoding the downlink control message after the end of the first downlink communications resources.

8. A method according to claim 1, wherein the pre-configured end time is a predetermined duration after the start of the first downlink communications resources.

9. A method according to claim 1, wherein the downlink control message comprises an indication of an index value of a predetermined table, the predetermined table comprising:
   a plurality of index values and,
   for each of the plurality of index values, an indication of communications resources, and
   the second downlink communications resources are associated with the index value indicated by the downlink control message.

10. A method according to claim 9, the method comprising
    receiving an indication that one or more index values of the predetermined table are deactivated, wherein the pre-configured end time is a latest end time of any communications resources associated with an index value of the predetermined table which is not deactivated.

11. A method according to claim 9, the method comprising
    receiving an indication that the predetermined table is activated, wherein
    the predetermined table is one of a plurality of predetermined tables.

12. A method according to claim 9, wherein each index value of the predetermined table is associated with a delay value, the delay value indicating a number of orthogonal frequency division multiplexing (OFDM) symbol periods between a start of the first downlink communications resources and a start of the second downlink communications resources.

13. A method according to claim 1, wherein the pre-configured end time is a latest end time of any communications resources associated with an index value of the predetermined table.

14. A method according to claim 1, wherein the downlink control message comprises an indication of an index value of a predetermined table, the predetermined table comprising a plurality of index values and, for each of the plurality of index values, an indication of communications resources, the method comprising
    determining that the communications resources associated with the index value indicated by the downlink control message end after the pre-configured end time, and
    determining the second communications resources based on the index value indicated by the downlink control message in accordance with a predetermined rule for adapting the communications resources which are associated with an index value indicated by a downlink control message and which end after the pre-configured end time.

15. A method according to claim 1, the method comprising:
    determining that a first power-saving mode is in operation, wherein
    according to the first power-saving mode, the pre-configured end time is no later than a maximum decoding delay for decoding the downlink control message after the end of the first downlink communications resources.

16. A method according to claim 15, the method comprising
    determining the pre-configured end time in response to determining that the first power-saving mode is in operation.

17. A method according to claim 15, wherein the first downlink communications resources are determined in accordance with a predetermined schedule defining a plurality of downlink communications resources which may be used for the transmission of downlink control messages to the communications device.

18. A method according to claim 1, wherein the downlink control message is transmitted in a first manner allowing reception using less power consumption, and the downlink data is transmitted in a second manner that requires more power consumption than used to receive the first downlink communications resources.

19. A communications device for use in a wireless communications network, the wireless communications network comprising an infrastructure equipment providing a wireless access interface, the communications device comprising
    a transmitter configured to transmit uplink data via the wireless access interface,
    a receiver configured to receive signals, and circuitry configured to:
control the transmitter and the receiver so that the communications device is operable:
receive a downlink control message transmitted in first downlink communications resources of the wireless access interface, the downlink control information providing an indication of second downlink communications resources from which the communications device can receive downlink data,
decode the downlink control message to identify the second downlink communications resources for receiving the downlink data, and
receive the downlink data from the second downlink communications resources, wherein the first and the second downlink communications resources overlap and are within a time period of the wireless access interface which ends at a pre-configured end time, the pre-configured end time being before the downlink control message is decoded.

20. A communications device for use in a wireless communications network, the wireless communications network comprising an infrastructure equipment providing a wireless access interface, the communications device comprising:
a transmitter configured to transmit uplink data via the wireless access interface,
a receiver configured to receive signals, and
a circuitry configured to:
control the transmitter and the receiver so that the communications device is operable:
receive a downlink control message transmitted in first downlink communications resources of the wireless access interface, the downlink control information providing an indication of second downlink communications resources from which the communications device can receive downlink data,
decode the downlink control message to identify the second downlink communications resources for receiving the downlink data, and
receive the downlink data from the second downlink communications resources, wherein the second downlink communications resources are within a time period of the wireless access interface which starts at a pre-configured start time, the pre-configured start time being before the downlink control data is decoded and after the first downlink communications resources, such that the downlink control message transmitted in the first downlink communications resources and the start of the second downlink communications resources overlap in time period.

* * * * *